United States Patent
Narita

(10) Patent No.: US 8,743,438 B2
(45) Date of Patent: Jun. 3, 2014

(54) IMAGE PROCESSING APPARATUS, IMAGE PROCESSING METHOD, AND COMPUTER-READABLE MEDIUM

(75) Inventor: Tateki Narita, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 265 days.

(21) Appl. No.: 13/296,710

(22) Filed: Nov. 15, 2011

(65) Prior Publication Data

US 2012/0162673 A1 Jun. 28, 2012

(30) Foreign Application Priority Data

Dec. 28, 2010 (JP) ................................. 2010-293806

(51) Int. Cl.
*G03F 3/08* (2006.01)
*H04N 1/60* (2006.01)
*G06K 9/00* (2006.01)

(52) U.S. Cl.
USPC ............................. 358/518; 358/1.9; 382/167

(58) Field of Classification Search
USPC .................... 358/1.9, 520, 518; 382/167, 162
See application file for complete search history.

(56) References Cited

U.S. PATENT DOCUMENTS

| | | | | |
|---|---|---|---|---|
| 5,581,358 A * | 12/1996 | Seto et al. | ..................... | 358/3.24 |
| 5,907,332 A * | 5/1999 | Fujita et al. | ..................... | 347/15 |
| 6,381,369 B1 * | 4/2002 | Kondo | .......................... | 382/238 |
| 7,542,076 B2 * | 6/2009 | Sugimori | ................... | 348/223.1 |
| 7,738,143 B2 * | 6/2010 | Ishimoto et al. | ............. | 358/3.28 |
| 8,213,057 B2 * | 7/2012 | Kabashima | ................... | 358/3.27 |
| 2002/0126329 A1 * | 9/2002 | Kuwata | .......................... | 358/518 |
| 2004/0175207 A1 * | 9/2004 | Shoji et al. | ..................... | 399/274 |
| 2005/0219580 A1 * | 10/2005 | Ozawa | .......................... | 358/1.9 |
| 2007/0047827 A1 * | 3/2007 | Sugita | .......................... | 382/232 |
| 2007/0147929 A1 * | 6/2007 | Ishimoto et al. | ................ | 400/62 |
| 2008/0018919 A1 * | 1/2008 | Ohkawa | ....................... | 358/1.9 |
| 2011/0019910 A1 * | 1/2011 | Kameyama | ................... | 382/163 |
| 2011/0036251 A1 * | 2/2011 | Hakamada et al. | ........... | 101/114 |
| 2011/0075174 A1 * | 3/2011 | Kajihara et al. | ............... | 358/1.9 |
| 2012/0187190 A1 * | 7/2012 | Wang et al. | .............. | 235/462.06 |

FOREIGN PATENT DOCUMENTS

| | | |
|---|---|---|
| JP | 2004-314308 A | 11/2004 |
| JP | 2009-139664 A | 6/2009 |
| JP | 2009-152766 A | 7/2009 |

* cited by examiner

*Primary Examiner* — Madelein A Nguyen

(74) *Attorney, Agent, or Firm* — Fitzpatrick, Cella, Harper & Scinto

(57) ABSTRACT

An image processing apparatus for performing image thinning processing, comprises: a thinning unit configured to be able to execute a plurality of thinning processes which have different output image qualities and processing times; an acquisition unit configured to acquire status information indicating a status of the apparatus; a division unit configured to divide an image into a plurality of divided images; a prediction unit configured to predict a processing time when thinning processing executed by the thinning unit is applied to each divided image divided by the division unit; and a selection unit configured to select, based on the status information acquired by the acquisition unit and the predicted processing time predicted by the prediction unit, thinning processing to be applied to each divided image from the plurality of thinning processes executed by the thinning unit.

8 Claims, 14 Drawing Sheets

FIG. 6

|  |  | JOB TO BE EXECUTED NEXT | | | | |
|---|---|---|---|---|---|---|
|  |  | Copy | Scan | PC Print | Fax Print | Media Print |
| JOB BEING EXECUTED | Copy |  | × | × | (○) | × |
|  | Scan | × |  | (○) | (○) | ○ |
|  | PCPrint | × | ○ |  |  | × |
|  | FaxPrint | ○ | ○ | (○) |  | ○ |
|  | MediaPrint | × | ○ | × | (○) |  |

INPUT IMAGE DATA

DETERMINATION PROCESSING FOR EVERY 8 BITS

EXTRACTION OF THINNING REGION

EXECUTION OF THINNING PROCESSING

INPUT IMAGE DATA

EXTRACTION OF
THINNING REGION

EXECUTION OF
THINNING PROCESSING

INPUT IMAGE DATA

EXTRACTION OF LINE EDGES

EXTRACTION OF BLACK EDGES

EXTRACTION OF THINNING REGION

EXECUTION OF THINNING PROCESSING

FIG. 12

| y | IMAGE DATA | LINE WIDTH COUNTER | GRAY WIDTH COUNTER | THINNING REGION WIDTH | THINNING REGION FLAG | EXTRACTION OF THINNING REGION |
|---|---|---|---|---|---|---|
| 0 | | 0 | 0 | 0 | OFF | — |
| 1 | | 0 | 0 | 0 | OFF | — |
| 2 | | 1 | 1 | 0 | OFF | — |
| 3 | | 2 | 0 | 1 | ON | — |
| 4 | | 3 | 0 | 2 | ON | — |
| 5 | | 4 | 1 | 3 | ON | — |
| 6 | | 5 | 2 | 4 | ON | — |
| 7 | | 6 | 0 | 5 | ON | — |
| 8 | | 7 | 1 | 6 | ON | — |
| 9 | | 8 | 2 | 7 | ON | — |
| 10 | | 0 | 0 | 0 | OFF | EXECUTION |
| 11 | | 0 | 0 | 0 | OFF | — |

IMAGE PROCESSING APPARATUS, IMAGE PROCESSING METHOD, AND COMPUTER-READABLE MEDIUM

BACKGROUND OF THE INVENTION

1. Field of the Invention

The present invention relates to an image processing apparatus, an image processing method, and a computer-readable medium and, more particularly, to a technique of controlling image thinning processing.

2. Description of the Related Art

Today, an image processing apparatus such as a copying machine or printer which prints image data sent from an input apparatus such as a host computer or image scanner is widely used. In development by such an image processing apparatus, if a toner adhering amount is large, that is, if an amount of supplied toner is large, toner is scattered without completely adhering, thereby missing toner in a part where a dot density is high. It is known that the frequency of occurrence of such problem varies depending on environmental conditions such as a humidity and temperature in which the image processing apparatus is installed. Various types of media such as a paper sheet are used for printing, and a similar problem may occur depending on the type of medium. It is known that such problem tends to occur more frequently upstream in a medium conveyance direction.

When forming an image of a straight line in the main scanning direction, toner is scattered backward in the sub-scanning direction of the line recorded on a transfer material, thereby disturbing the image. Due to an abrupt increase in temperature when the transfer material passes through a fixing unit, water in the transfer material may evaporate. In this case, if the amount of supplied toner is large, there is no way for the water vapor of the transfer material to escape, which scatters the toner backward in the conveyance direction, thereby causing the above-described problem. In this specification, "the phenomenon of tailing-blur" indicates a phenomenon in which, for a straight line image in the main scanning direction, toner is scattered backward in the sub-scanning direction, thereby disturbing the image.

To avoid the phenomenon of tailing-blur, a method of decreasing a toner adhering amount has been conventionally adopted. In Japanese Patent Laid-Open No. 2004-314308, for example, since the phenomenon of tailing-blur tends to occur in an image region having specific features, an image region having such specific features is extracted, and the image data of the extracted image region undergoes thinning processing. This reduces a toner adhering amount while suppressing deterioration of the image quality.

In Japanese Patent Laid-Open No. 2004-314308, to extract an image region having specific features, an edge determination for a solid image region is made and whether the image region of a pixel of interest is to be processed is then determined on the assumption that input image data to be processed is a binary image. In Japanese Patent Laid-Open No. 2009-152766, to extract an image region, image data to be processed is extended to a multi-valued image by calculating a binarized threshold based on the adjacent pixel density of a pixel of interest, thereby improving the accuracy of edge determination.

Furthermore, it is known to switch execution of the above-described thinning processing depending on conditions. If image data read by an image scanner is input, it is difficult to extract an effective image region by making conventional edge determination due to unevenness of edges. It is, therefore, impossible to appropriately extract an image region to be thinned. To solve this problem, in Japanese Patent Laid-Open No. 2009-139664, if image data received from an external apparatus such as a host computer is input, image region extraction processing is executed by making edge determination, and the extracted region undergoes thinning processing. On the other hand, if image data read by an image scanner is input, a toner adhering amount is decreased by decreasing the developing property, for example, by reducing the direct-current component of a developing bias.

In thinning processing which improves the accuracy of extracting an image region by making edge determination, the toner scattering prevention effect improves but the processing time increases since the processing is complicated. In this specification, thinning processing in which the toner scattering prevention effect is high and the processing time is long will be referred to as "high image quality thinning processing". To the contrary, thinning processing using conventional edge determination, in which the toner scattering prevention effect is low and the processing time is short, will be referred to as "low image quality thinning processing". The high image quality thinning processing and the low image quality thinning processing will be explained in detail later in a description of embodiments.

Low image quality thinning processing can present a sufficient image quality for an image for which edge determination is easy. Since, however, whether edge determination is easy depends on the contents of an image, and cannot be determined prior to processing, high image quality thinning processing or low image quality thinning processing is selected and executed rather unconditionally in a conventional technique. If an image quality has priority, high image quality thinning processing is executed, which increases the processing time, thereby lowering the productivity of a printing operation as a whole.

If a software component executes thinning processing, the processing time changes depending on an operational environment. That is, in an environment where another processing (processing other than thinning processing) operates simultaneously with thinning processing, the processing time of the thinning processing may increase depending on the CPU activity ratio (a load on a CPU resource) of the other processing. In an environment where another processing simultaneously operates, therefore, the productivity of a printing operation as a whole lowers. Furthermore, since the processing time of high image quality thinning processing is inherently long, a decrease in productivity due to the influence of another processing is particularly large.

SUMMARY OF THE INVENTION

The present invention has been made in consideration of the above-described problems, and provides an image processing apparatus which executes high image quality thinning processing while ensuring given productivity even in an environment where another processing simultaneously operates.

According to one aspect of the present invention, there is provided an image processing apparatus for performing image thinning processing, comprising: a thinning unit configured to be able to execute a plurality of thinning processes which have different output image qualities and processing times; an acquisition unit configured to acquire status information indicating a status of the apparatus; a division unit configured to divide an image into a plurality of divided images; a prediction unit configured to predict a processing time when thinning processing executed by the thinning unit is applied to each divided image divided by the division unit;

and a selection unit configured to select, based on the status information acquired by the acquisition unit and the predicted processing time predicted by the prediction unit, thinning processing to be applied to each divided image from the plurality of thinning processes executed by the thinning unit.

According to another aspect of the present invention, there is provided an image processing method of performing image thinning processing, comprising: a thinning step capable of executing a plurality of thinning processes which have different output image qualities and processing times; an acquisition step of managing status information indicating a status of an image processing apparatus; a division step of dividing an image into a plurality of divided images; a prediction step of predicting a processing time when thinning processing executed in the thinning step is applied to each divided image divided in the division step; and a selection step of selecting, based on the status information acquired in the acquisition step and the predicted processing time predicted in the prediction step, thinning processing to be applied to each divided image from the plurality of thinning processes executed in the thinning step.

According to another aspect of the present invention, there is provided a computer-readable medium storing a program for causing a computer to function as a thinning unit configured to able to execute a plurality of thinning processes which have different output image qualities and processing times; an acquisition unit configured to acquire status information indicating a status of the computer; a division unit which divides an image into a plurality of divided images; a prediction unit configured to predict a processing time when thinning processing executed by the thinning unit is applied to each divided image divided by the division unit; and a selection unit configured to select, based on the status information acquired by the acquisition unit and the predicted processing time predicted by the prediction unit, thinning processing to be applied to each divided image from the plurality of thinning processes executed by the thinning unit.

According to another aspect of the present invention, there is provided an image processing apparatus which can execute first image processing and second image processing in which a resultant image quality is low and a processing time is short as compared with the first image processing, the apparatus comprising: a division unit configured to divide image data into a plurality of images; and a selection unit configured to select, based on a load rate of a CPU of the apparatus, one of the first image processing and the second image processing to be executed for each divided image divided by the division unit.

According to another aspect of the present invention, there is provided an image processing method for an image processing apparatus which can execute first image processing and second image processing in which a resultant image quality is low and a processing time is short as compared with the first image processing, the method comprising: a division step of dividing image data into a plurality of images; and a selection step of selecting, based on a load rate of a CPU of the image processing apparatus, one of the first image processing and the second image processing to be executed for each divided image divided in the division step.

According to another aspect of the present invention, there is provided a computer-readable medium storing a program for causing a computer to function as a division unit configured to divide image data into a plurality of images; and a selection unit configured to select, based on a load rate of a CPU of the computer, one of first image processing and second image processing in which a resultant image quality is low and a processing time is short as compared with the first image processing, to be executed for each divided image divided by the division unit.

It is possible to provide an image processing apparatus which executes high image quality thinning processing while ensuring given productivity even in an environment where another processing simultaneously operates.

Further features of the present invention will become apparent from the following description of exemplary embodiments (with reference to the attached drawings).

BRIEF DESCRIPTION OF THE DRAWINGS

FIG. 6 is a table showing an example of conflicting operation determination of the thinning processing control according to the embodiment;

FIG. 12 is a table showing counters in thinning region extraction processing and execution of the processing according to the embodiment.

DESCRIPTION OF THE EMBODIMENTS

Embodiment for carrying out the present invention will be described below with reference to the accompanying drawings. As an embodiment of the present invention, a case in which the present invention is applied to a copying machine will explained. The present invention, however, is not limited to this, and is also applicable to an electrophotographic image processing apparatus such as an arbitrary printer or facsimile apparatus without departing from the spirit and scope of the present invention.

[System Configuration]

Figure 1:
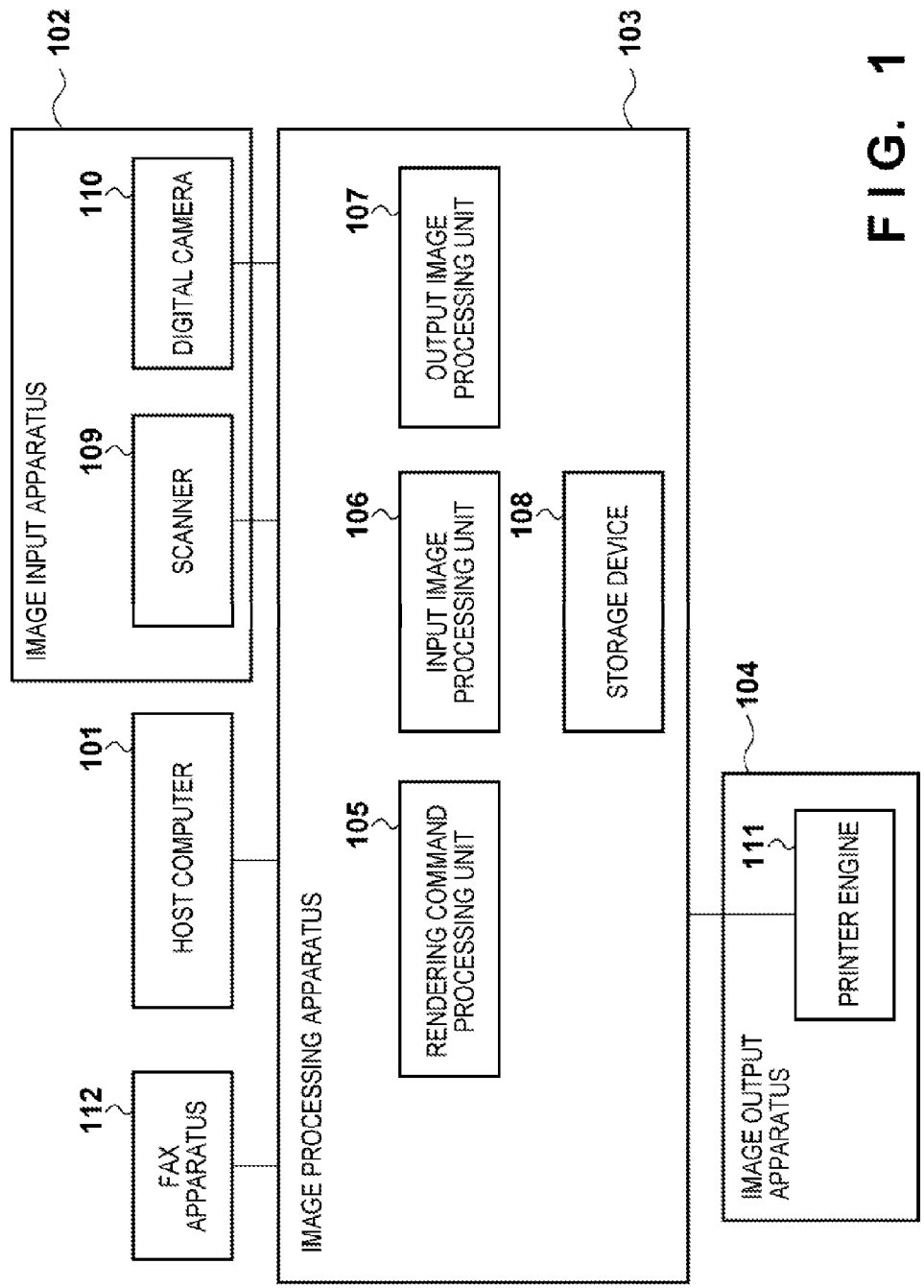
FIG. 1 is a block diagram showing the functional configuration of a copying machine according to an embodiment.

FIG. 1 is a block diagram showing the functional configuration of a copying machine according to the embodiment. The copying machine includes an image input apparatus 102, an image processing apparatus 103, and an image output apparatus 104. Note that the system configuration shown here is merely an example and the present invention is not limited to this. Processing of receiving a rendering command transmitted from a host computer, and performing a printing operation will be described below with reference to FIG. 1.

Referring to FIG. 1, a host computer 101 can create a page layout document, a word processor document, a graphic document, and the like using applications running on it, respectively. Digital document data created by the application is transmitted to a printer driver (not shown), and a rendering command is generated based on the digital document. The generated rendering command is generally described in PDL (Page Description Language) used to create page image data. The rendering command usually contains instructions to render data such as images, graphics, and text. In this embodiment, a case in which PDL is used will be described.

The generated rendering command is transmitted to the image processing apparatus 103 connected with the host computer 101 via a network or the like. The image processing apparatus 103 includes a rendering command processing unit 105, an input image processing unit 106, an output image processing unit 107, and a storage device 108.

Referring to FIG. 1, a printer engine 111 is included in the image output apparatus 104 connected with the image processing apparatus 103. The printer engine 111 receives, from the image processing apparatus 103, image data generated in a predetermined image format, and prints it on a printing medium (a paper sheet or the like). In general, to allow a stable halftone representation in the printer engine 111, it is necessary to perform low-tone output such as 2-, 4-, or 16-tone output. Image data supporting four color materials including cyan (C), magenta (M), yellow (Y), and black (K) is generally input to the printer engine 111. The format of the image data to be input to the printer engine 111 is a low-tone CMYK image such as 2 to 16-tone image. Although an image having the above-mentioned characteristics is assumed to be processed in this embodiment, the present invention is not limited to this.

The rendering command transmitted from the host computer 101 undergoes analysis processing in the rendering command processing unit 105 of the image processing apparatus 103 to generate a rendering object, and then undergoes rasterize processing to generate a bitmap image. The output image processing unit 107 then converts the generated bitmap image into an image format which can be transferred to the printer engine 111. If the generated bitmap image is an RGB image, it undergoes color conversion processing for performing color conversion from RGB to CMYK using a lookup table and the like. Alternatively, if the bitmap image is a multi-tone image, the output image processing unit 107 executes, for the bitmap image, image processing such as halftone processing for converting the image into a lower-tone image using dithering and the like.

The thus generated image data is transferred to the printer engine 111 of the image output apparatus 104, thereby outputting the image on a sheet of paper. The processing of printing, as an image, the rendering command from the host computer 101 thus ends.

Next, processing of printing an image input from a FAX apparatus 112 will be described. The FAX apparatus 112 is connected with the image processing apparatus 103 via a communication line such as a telephone line, and transmits a binary image according to the FAX communication standard. The image transmitted from the FAX apparatus 112 has been generated at a resolution defined by the FAX communication standard. The output image processing unit 107 of the image processing apparatus 103, therefore, performs resolution conversion for the received image according to the output resolution of the printer engine 111. The output image processing unit 107 executes thinning processing for the image undergone resolution conversion.

The thus generated image data is transferred to the printer engine 111, thereby outputting the image on a paper sheet or the like. The processing of printing the binary image transmitted from the FAX apparatus 112 thus ends.

Processing of printing a bitmap image input from the image input apparatus 102 such as a scanner 109 or digital camera 110 will be described next. The scanner 109 of FIG. 1 is connected with the image processing apparatus 103. The scanner 109 reads a bitmap image by optically scanning an image printed on a paper sheet or film, measuring the intensity of a reflected light or transmitted light, and performing analog-to-digital conversion (A/D conversion). The digital camera 110 of FIG. 1 acquires a captured image as a bitmap image by converting a light intensity into an electrical signal using a CCD (not shown) in which photodiodes are arranged. The acquired bitmap image is generally an RGB image.

The input image processing unit 106 and output image processing unit 107 of the image processing apparatus 103 convert the bitmap image transmitted from the scanner 109 or digital camera 110 into a low-tone CMYK image. The thus generated low-tone image data is transferred to the printer engine 111, thereby outputting the image on a paper sheet or the like. The processing of printing the bitmap image input from the image input apparatus such as a scanner thus ends.

To decrease a toner adhering amount, in the above-described image data generation step, the output image processing unit 107 executes thinning processing for image data input as needed or image data to be transferred to the printer engine 111. More specifically, the output image processing unit 107 executes processing of extracting an image region in which thinning processing is to be performed for image data, and then executes, for the extracted image region, thinning processing for which a thinning amount has been adjusted. Note that each unit of the image processing apparatus 103 operates during execution of the thinning processing. If a software component executes the thinning processing, therefore, its processing time increases due to a conflict with another processing (processing other than thinning processing) over the CPU resource.

[Configuration of Image Processing Apparatus]

Figure 2:
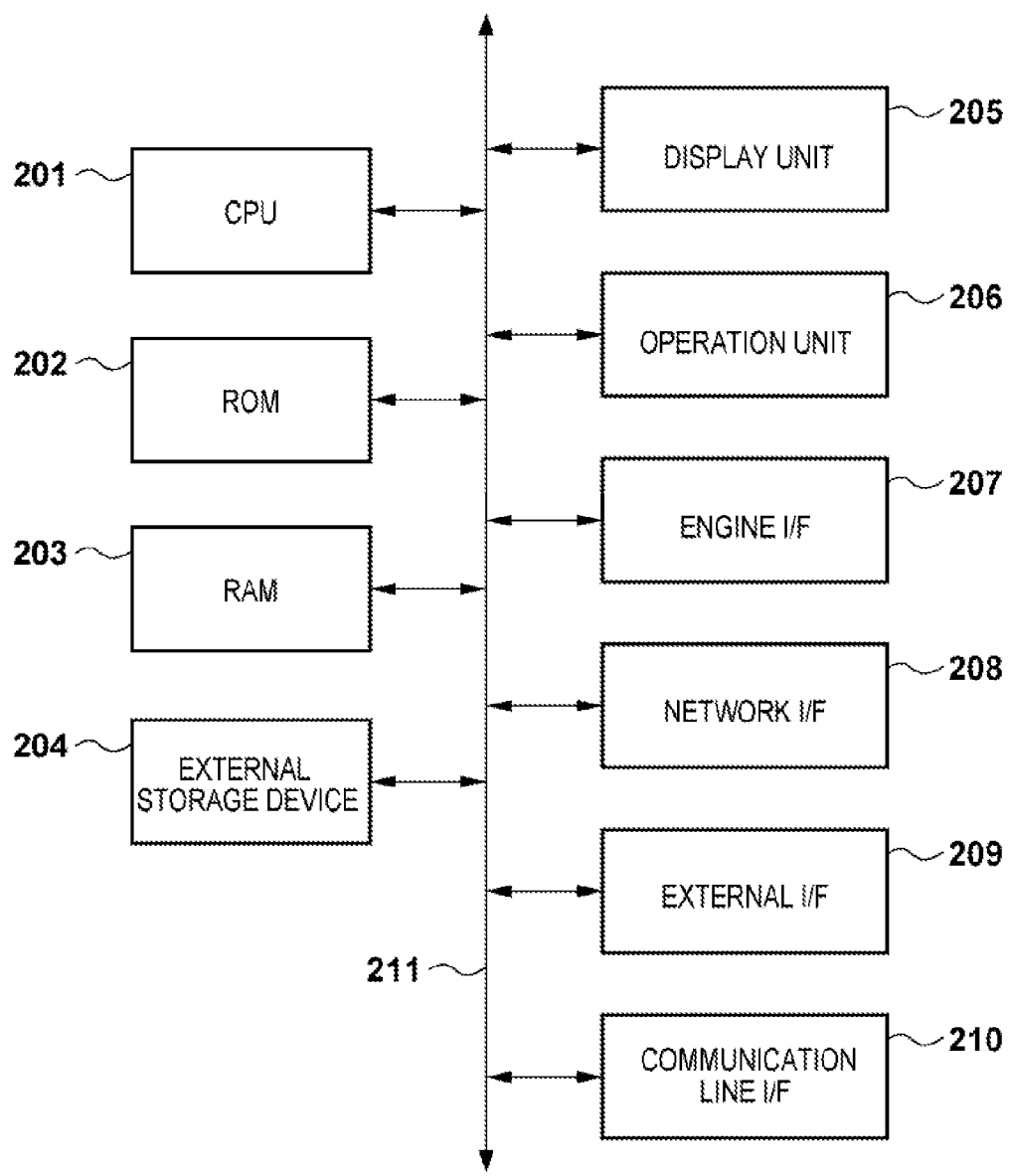
FIG. 2 is a block diagram showing the configuration of an image processing apparatus according to the embodiment.

FIG. 2 is a system block diagram showing the basic configuration of the image processing apparatus 103 according to this embodiment. The image processing apparatus 103 includes a CPU 201, a ROM 202, a RAM 203, an external storage device 204, a display unit 205, an operation unit 206, an engine I/F 207, a network I/F 208, an external I/F 209, a communication line I/F 210, and a system bus 211. Note that "I/F" indicates "interface".

The configuration of the image processing apparatus 103 will be described in detail below. The CPU 201 is a central processing unit for controlling the apparatus as a whole and performing computation processing, which executes each process (to be described later) based on a program stored in the ROM 202. The ROM 202 is a read only memory, which provides a storage area for a system start program, a program for controlling a printer engine, character data, character code information, and the like. The RAM 203 is a random access memory, which stores font data additionally registered by download and to which a program and data are loaded and then executed for each of various processes. The RAM 203 can also be used as a data storage area for received image data.

The external storage device 204 includes, for example, a hard disk. The external storage device 204, for example, spools data, stores programs, information files, and image data, and is used as a work area. The display unit 205, for example, presents a liquid crystal display or the like, and is used to display the setting status of each apparatus, and current processes, an error status, and the like within the apparatus. The operation unit 206 is used to change or reset settings, and can also display, in cooperation with the display unit 205, an operation screen for thinning processing (to be described later) in thinning pattern selection processing.

The engine I/F 207 exchanges a command or the like for controlling the printer engine 111. The network I/F 208 connects the image processing apparatus 103 to a network. The network I/F 208 transmits/receives image data to/from the host computer 101 via the network. The external I/F 209 is connected with the scanner 109 or digital camera 110 serving as the image input apparatus 102 via an interface such as a parallel (or serial) interface. The communication line I/F 210 connects the image processing apparatus 103 with the FAX apparatus 112 via a communication interface such as a telephone line. The system bus 211 serves as a data channel between the components of the above-described image processing apparatus 103.

A program corresponding to the processing procedure of each flowchart to be shown below in this specification is stored in any one of the ROM 202, RAM 203, and external storage device 204, and executed by the CPU 201.

[Thinning Processing]

Low image quality thinning processing and high image quality thinning processing according to this embodiment will be described in detail next. In this embodiment, thinning processing in which the toner scattering prevention effect is high and the processing time is long (the CPU load is high) will be referred to as "high image quality thinning processing" (first thinning processing). To the contrary, thinning processing using conventional edge determination, in which the toner scattering prevention effect is low and the processing time is short (the CPU load is low), will be referred to as "low image quality thinning processing" (second thinning processing). Processing to be explained below is exemplified, and is applicable to an image processing apparatus which can execute a plurality of thinning processes.

[Low Image Quality Thinning Processing]

Figure 7A:
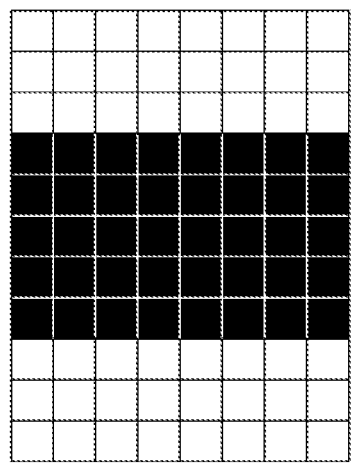
FIGS. 7A, 7B, 7C, and 7D are views for explaining low image quality thinning processing.
Figure 7B:
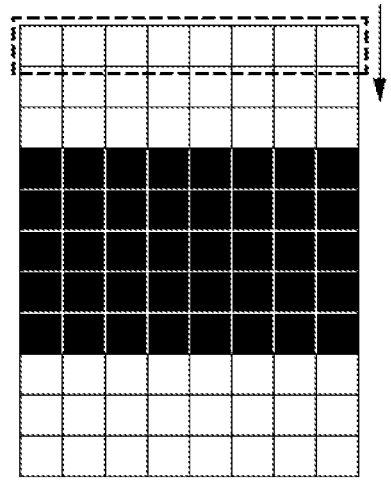
Figure 7C:
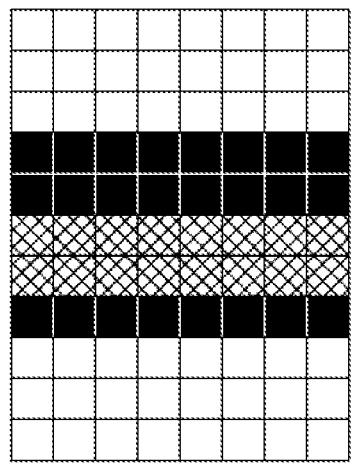
Figure 7D:
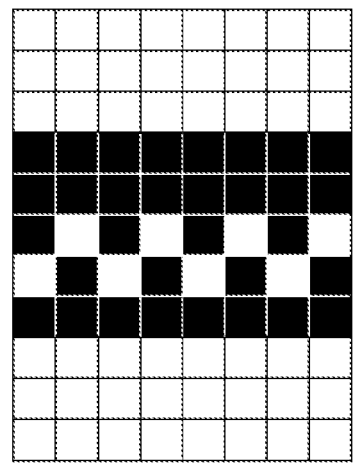

FIGS. 7A, 7B, 7C, and 7D are views for explaining the image region extraction processing and thinning processing of low image quality thinning processing. As shown in FIG. 7A, assume that image data including a line with a width of 5 pixels in the sub-scanning direction is input. FIG. 7B shows a case in which, to increase the processing speed, the image region extraction processing is executed every 8 pixels in the main scanning direction (horizontal direction). Horizontal edges are determined by sequentially making image region determination in the sub-scanning direction, and an image region to undergo the thinning processing is extracted based on the obtained line width information. A crosshatched portion in FIG. 7C represents the image region extracted as a thinning processing target. A case in which the thinning processing has been applied to the extracted image region is shown in FIG. 7D. Note that a method (extraction conditions) of extracting a region to be processed and a thinning processing method are not limited to the above-described methods, and other methods may be used. Although the processing is executed every 8 pixels in the main scanning direction in this embodiment, the present invention is not limited to this. For example, the processing may be executed every 4 or 16 pixels, or every other number of pixels.

Figure 8:
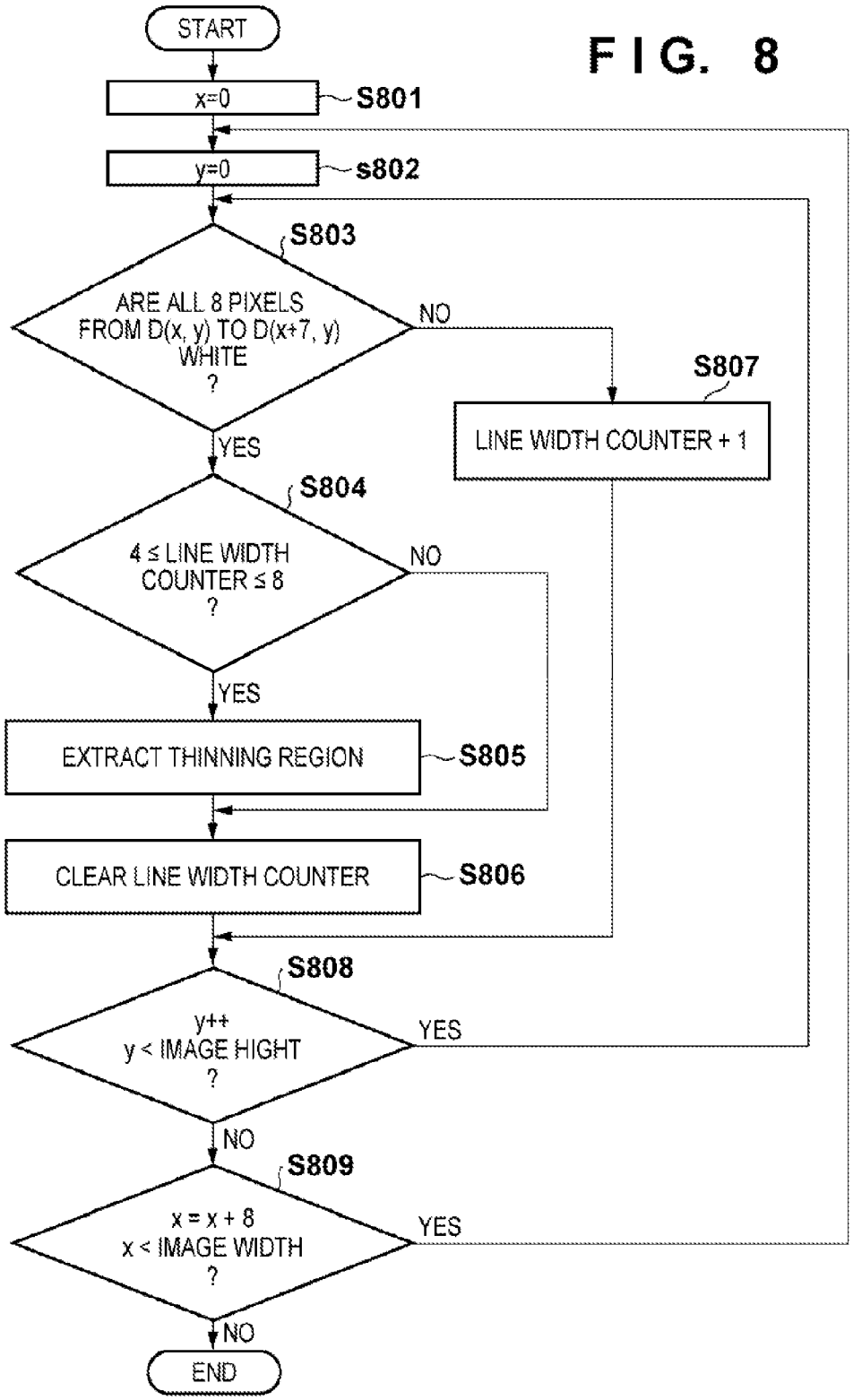
FIG. 8 is a flowchart illustrating low image quality thinning processing according to the embodiment.

FIG. 8 shows the procedure of the image region extraction processing of the low image quality thinning processing in the practical example shown in FIGS. 7A, 7B, 7C, and 7D. Let x be a coordinate position in the main scanning direction in image data, y be a coordinate position in the sub-scanning direction, and D(x, y) be the density of the image data (a pixel) at a position (x, y). In this embodiment, an input image is a binary image, and its density is represented by 1 bit. Therefore, if a pixel of interest is formed by toner, D=1; otherwise, D=0. Furthermore, "line width" to be described below indicates the number of pixels forming a line in the sub-scanning direction. FIGS. 7A, 7B, 7C, and 7D show an image having 8 pixels in the main scanning direction and 11 pixels in the sub-scanning direction for descriptive convenience. An image to be used for actual processing, however, has a larger number of pixels. In this embodiment, therefore, by setting 8 pixels in the main scanning direction as a unit, all pixels in the sub-scanning direction for the 8 pixels in the main scanning direction are processed, and then an image for next 8 pixels in the main scanning direction is processed.

To sequentially making determination for pixels contained in input image data, the CPU 201 initializes, to 0, the arguments x and y indicating coordinates (S801 and S802). In step S803, the CPU 201 determines whether all 8 pixels in an image region as an input image data determination target are white, that is, all the pixels have "D=0". In this embodiment, it is possible to increase the processing speed by making determination for the 8 pixels all at once. If all the 8 pixels are white, it is possible to determine all at once whether the 8 pixels (8 bits) have "0x00" since each pixel of the image data is represented by 1 bit. If not all the 8 pixels are white, that is, at least one of the 8 pixels is black (NO in step S803), the CPU 201 determines the line of interest as a line region, and counts up a line width counter (S807). The process then advances to step S808.

Alternatively, if all the 8 pixels are white (YES in step S803), the CPU 201 determines a line width based on the value of the line width counter (S804). If the line width counter indicates a width of 4 to 8 pixels in the sub-scanning direction, in which the phenomenon of tailing-blur tends to occur (YES in step S804), the CPU 201 extracts a region to undergo thinning processing (S805). The process then advances to step S806. Alternatively, if the line width is smaller than a width of 4 pixels or larger than a width of 8 pixels (NO in step S804), the process advances to step S806 without performing the region extraction processing. In step S806, the CPU 201 clears the line width counter. Then, the CPU 201 applies the processing in steps S803 to S807 to all the pixels in the sub-scanning direction for the 8 pixels in the main scanning as a unit (S808). When the processing is complete for the pixels in the sub-scanning direction for the 8 pixels in the main scanning direction, the CPU 201 applies the processing in steps S802 to S808 to an image for next 8 pixels in the main scanning direction (S809), and the extraction processing ends.

Although a line width value ranging from 4 to 8 pixels is used for line width determination of the thinning processing in this embodiment, the present invention is not limited to this. For example, the value may be changed for each color in consideration of the characteristics of toner.

In the above-described region extraction processing of the low image quality thinning processing, if target image data includes edges as straight lines shown in FIGS. 7A, 7B, 7C, and 7D, it is possible to effectively extract an image region to be applied with thinning processing in order to reduce the phenomenon of tailing-blur. An example of such image data includes image data obtained by mapping PDL print data sent from the host computer 101. For image data read by an image scanner, however, even though an image of a straight line is actually read for an edge of a line region, the read image may not include a straight line.

By referring to input source information attached to image data, thinning processing for the image data may be switched according to the input source of the image data. For example, low image quality thinning processing may be performed for PDL image data sent from the host computer 101, and high image quality thinning processing may be performed for image data read by an image scanner.

[Low Image Quality Thinning Processing for Image Data Read by Image Scanner]

Figure 9A:
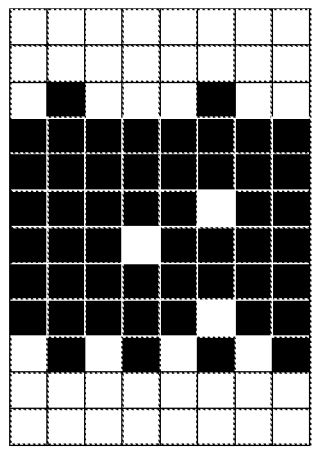
FIGS. 9A, 9B, and 9C are views for explaining the low image quality thinning processing.
Figure 9B:
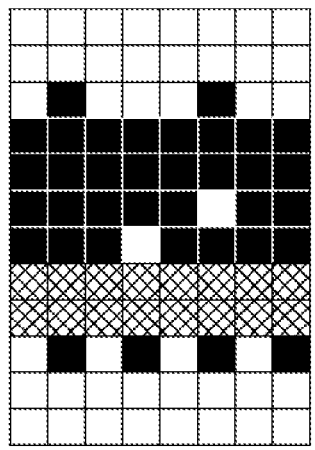
Figure 9C:
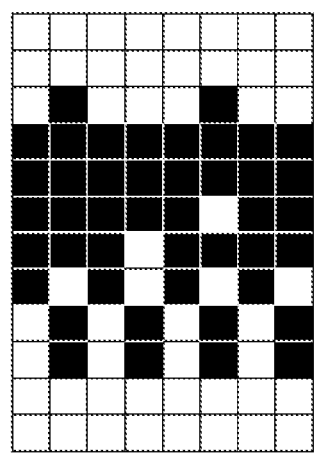

FIGS. 9A, 9B, and 9C show an example of image data acquired by an image scanner (the scanner 109) and a case in which the image region extraction processing and thinning processing of low image quality thinning processing are applied to the image data.

As shown in FIG. 9A, if an image scanner reads a horizontal line included in an image, its edges are not necessarily read as straight lines, and an uneven image may be read. Furthermore, noise may occur within the line in reading. A crosshatched portion shown in FIG. 9B indicates a region extracted in the image region extraction processing shown in the flowchart of FIG. 8. A result of executing thinning processing for the extracted image region is shown in FIG. 9C. Referring to FIG. 9C, it is found that interference of the thinning processing with unevenness of the edges of the original input image data deteriorates the image quality.

[High Image Quality Thinning Processing]

Figure 10A:
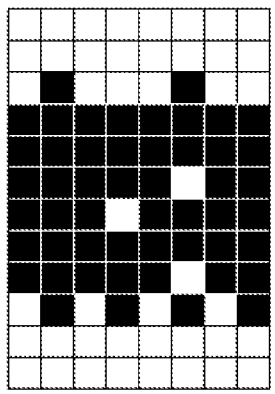
FIGS. 10A, 10B, 10C, 10D, and 10E are views for explaining high image quality thinning processing.
Figure 10B:
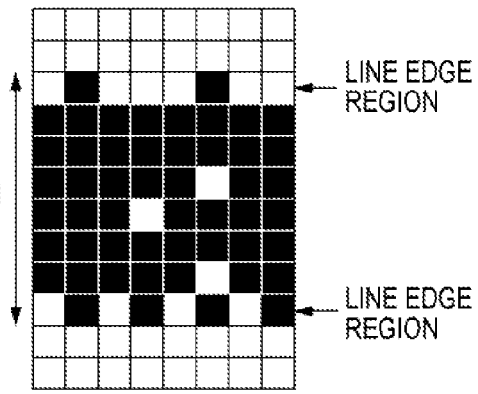

FIGS. 10A, 10B, 10C, 10D, and 10E are views for explaining the image region extraction processing and thinning processing of high image quality thinning processing. Image data shown in FIG. 10A is obtained by reading a horizontal line by an image scanner, and is identical to the image data shown in FIG. 9A. For the input image data, to increase the processing speed of the high image quality thinning processing, the processing is executed every 8 pixels in the main scanning direction (horizontal direction). Determination of an image region is made in the sub-scanning direction. Then, as shown in FIG. 10B, a boundary region (line) between a region in which all pixels as a determination target region are white and a region in which not all pixels in the same line are white, that is, at least one pixel is black is referred to as a "line edge region". That is, as shown in FIG. 10B, lines represented by (x, 2) and (x, 9) are line edge regions.

Figure 10C:
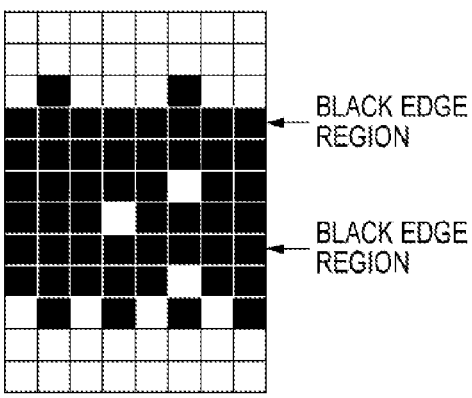
Figure 10D:
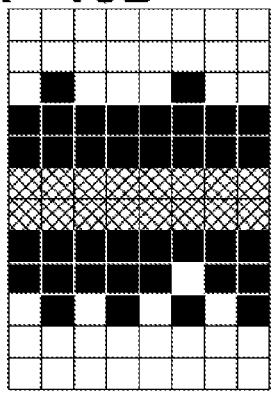

In an image region between the line edge regions, a region (line) in which all 8 pixels as a determination target region are black and which is nearest to the line edge region is referred to as a "black edge region". That is, as shown in FIG. 10C, lines represented by (x, 3) and (x, 7) are black edge regions. The number of lines between the line edge regions is referred to as a "line width". As represented by a crosshatched portion shown in FIG. 10D, an image region to undergo thinning processing is extracted based on the line width and a region width between the black edge regions. A case in which the thinning processing has been applied to the extracted image region is shown in FIG. 10E.

Figure 10E:
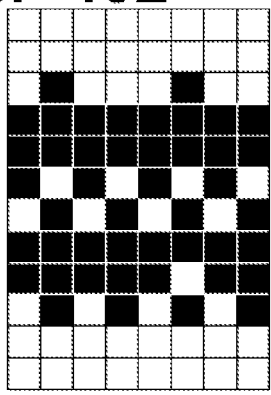

As shown in FIG. 10E, in the high image quality thinning processing, no interference of the thinning processing with unevenness of edges occurs unlike FIG. 9C, and the thinning processing is executed without deteriorating the image quality.

Figure 11A:
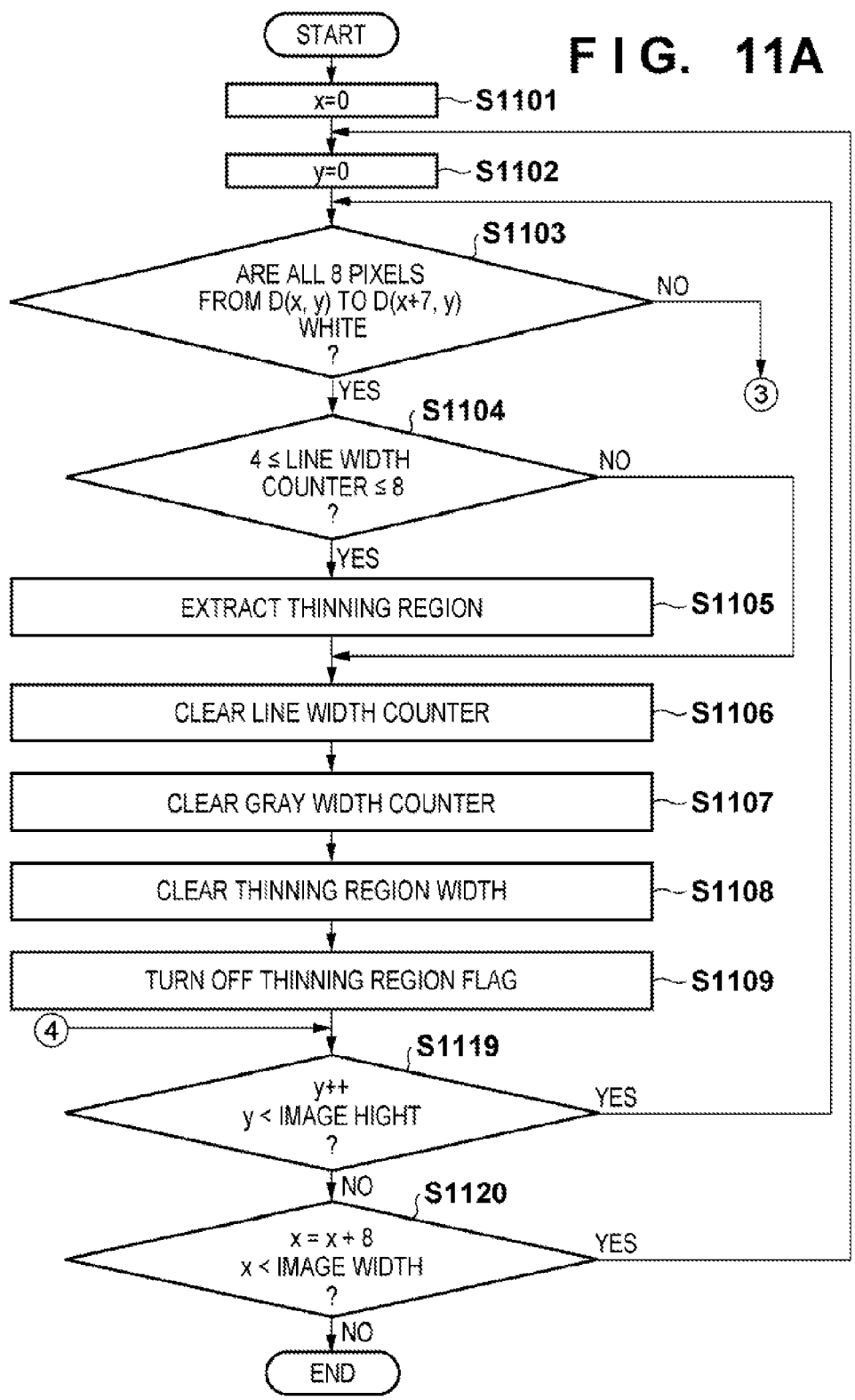
FIGS. 11A and 11B are flowcharts illustrating high image quality thinning processing according to the embodiment.
Figure 11B:
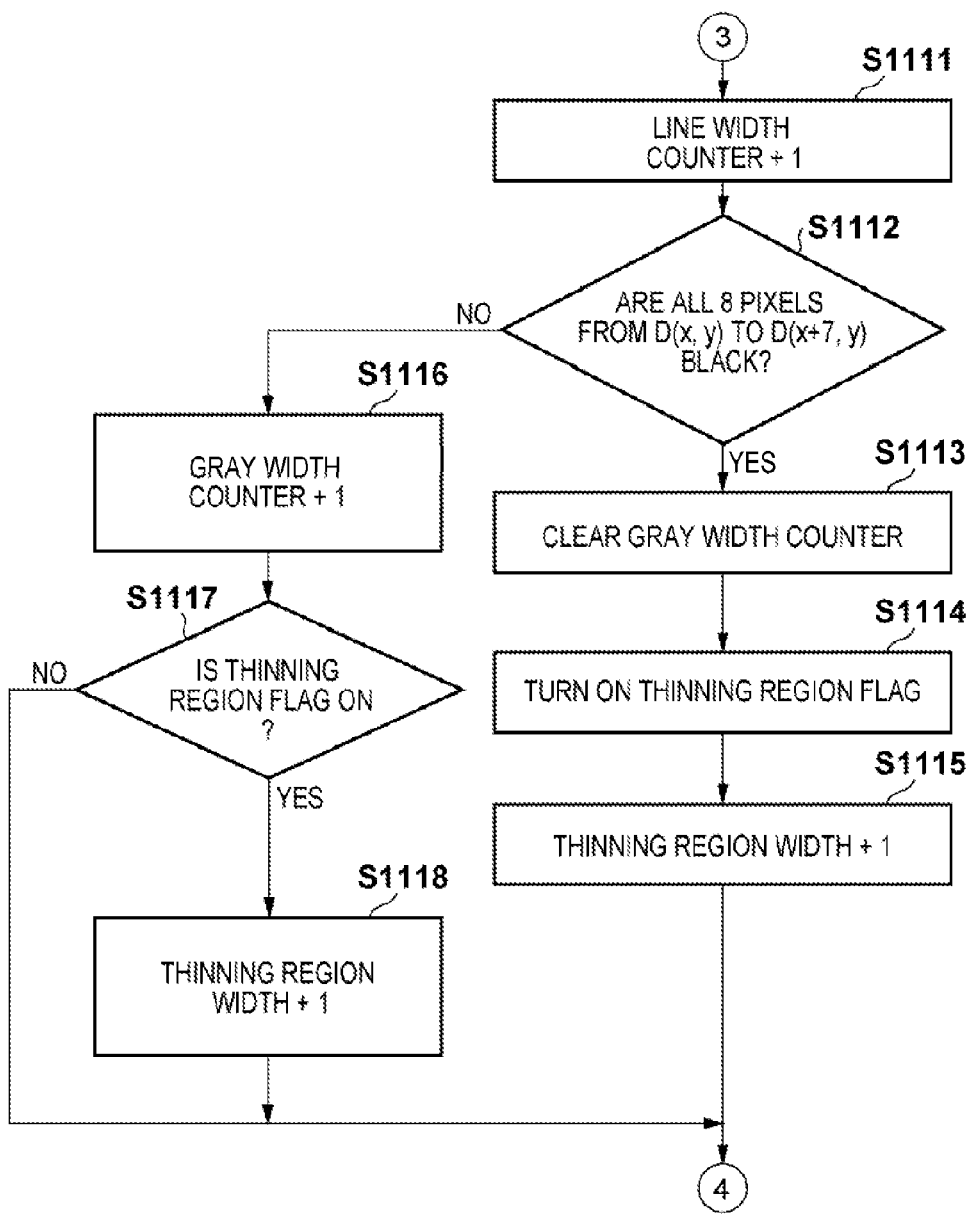

FIGS. 11A and 11B are flowcharts illustrating the image region extraction processing of the high image quality thinning processing. As in FIG. 8, let x be a coordinate position in the main scanning direction in image data and y be a coordinate position in the sub-scanning direction. Furthermore, D(x, y) indicates the density of the image data at a position (x, y). In this embodiment, an input image is a binary image, and its density is represented by 1 bit. If a pixel is formed by toner, D=1; otherwise, D=0.

To sequentially make determination for pixels contained in input image data, the CPU 201 initializes, to 0, the arguments x and y indicating coordinates (S1101 and S1102). In step S1103, the CPU 201 determines whether all 8 pixels in an image region as an input image data determination target are white, that is, all the pixels have "D=0". Note that in this embodiment, it is possible to increase the processing speed by making determination for the 8 pixels at a time. If not all the 8 pixels are white, that is, at least one of the 8 pixels is black (NO in step S1103), the CPU 201 determines the image region of interest as a line region, and counts up a line width counter (S1111). The CPU 201 determines whether all the 8 pixels in the determination target image region are black, that is, all the pixels have "D=1" (S1112). If all the 8 pixels are black, and it is possible to determine at a time whether the 8 pixels have "0xFF" since each pixel of the image data is represented by 1 bit. If all the 8 pixels of the image region of interest are black (YES in step S1112), the CPU 201 clears a gray width counter for counting a region in which not all 8 pixels are white or black (S1113). Furthermore, the CPU 201 turns on a thinning region flag (S1114), and counts up a thinning region width (S1115). Then, the process advances to step S1119. If not all the 8 pixels of the determination target image region are white or black (NO in step S1112), the CPU 201 counts up a gray width counter (S1116). If the thinning region flag is ON (YES in step S1117), the CPU 201 counts up the thinning region width (S1118). Then, the process advances to step S1119.

If all the 8 pixels are white (YES in step S1103), the CPU 201 determines a line width based on the value of the line width counter (S1104). If the line width counter indicates a width of 4 to 8 pixels in the sub-scanning direction, in which the phenomenon of tailing-blur tends to occur (YES in step S1104), the CPU 201 extracts, based on the counted value of the thinning region width and the counted value of the gray width, a region to undergo thinning processing (S1105). The process then advances to step S1106.

In step S1105, the CPU 201 subtracts the counted value of the gray width from that of the thinning region width to calculate the width of a region obtained by combining black edge regions with a thinning candidate region between the black edge regions. Furthermore, the CPU 201 extracts the position of the thinning candidate region using the y value, the counted value of the thinning region width, and the counted value of the gray width in executing the processing in step S1105. The CPU 201 can calculate a position at which a black edge starts by subtracting the counted value of the thinning region width from the y coordinate value (a position in the sub-scanning direction) in executing the processing in step S1105. The CPU 201 can also calculate the position of the gray region in a line immediately after the black edge by subtracting the counted value of the gray width from the y coordinate value. A region obtained by excluding the black edge region from a region with the calculated width is extracted as a thinning candidate region. The CPU 201 consequently extracts, as a region to undergo the thinning processing, a region between lines with a given width adjacent to the black edges in the extracted thinning candidate region.

The processing in step S1105 will be described in detail using the input image data shown in FIG. 10A. For the input image data shown in FIG. 10A, in executing the processing in step S1105 of FIG. 11A, the y coordinate value is "10", the counted value of the thinning region width is "7", the counted value of the gray width is "2", and the width of the region (thinning candidate region) between the black edge regions is "5". After the processing in step S1105, the counted value of the gray width and that of the thinning region width are cleared in steps S1107 and S1108, respectively. "3" is calculated by subtracting the counter value "7" of the thinning region width from the y coordinate value "10" in executing the processing in step S1105, which indicates the black edge starts with y=3. "8" is calculated by subtracting the counted value "2" of the gray width from the y coordinate value "10"

in executing the processing in step S1105, and a gray region including black and white pixels which is not a black edge is formed at y=8. Consequently, image data with y=3 to 7 is extracted as the black edge regions+the thinning candidate region.

As an example of this embodiment, FIG. 12 shows the relationship between the y coordinate (a position in the sub-scanning direction), the image data, the line width counter, the gray width counter, the thinning region width counter, the thinning region flag, and processing execution when executing the image region extraction processing for the input image data shown in FIGS. 10A, 10B, 10C, 10D, and 10E.

Referring to the relationship, it is found that it is possible to finally detect and extract the region between the black edge regions using the y coordinate value and a value obtained by subtracting the value of the gray width counter from that of the thinning region width counter when a white pixel region is detected.

On the other hand, if a line width is smaller than a width of 4 pixels or larger than a width of 8 pixels (NO in step S1104), the region extraction processing is not executed. The CPU 201 clears the values of the line width counter, gray width counter, and thinning region width counter (S1106 to S1108), and turns off the thinning region flag (S1109). The CPU 201 applies processing in steps S1103 to S1118 to all the pixels in the sub-scanning direction for the 8 pixels in the main scanning direction as a unit (S1119). After processing for the pixels in the sub-scanning direction for the 8 pixels in the main scanning direction is completed, the CPU 201 applies the processing in steps S1102 to S1119 to next 8 pixels in the main scanning direction (S1120), and ends the extraction processing.

Although a line width value ranging from 4 to 8 pixels is used for line width determination (S1104) of the thinning processing in this embodiment, the present invention is not limited to this. For example, the value may be changed for each color in consideration of the characteristics of toner.

[Comparison of Processing Times]

A control method and processing time of thinning processing according to a conventional technique or this embodiment will be described. Assume that a software component executes thinning processing executed in the image processing apparatus 103.

Figure 3:
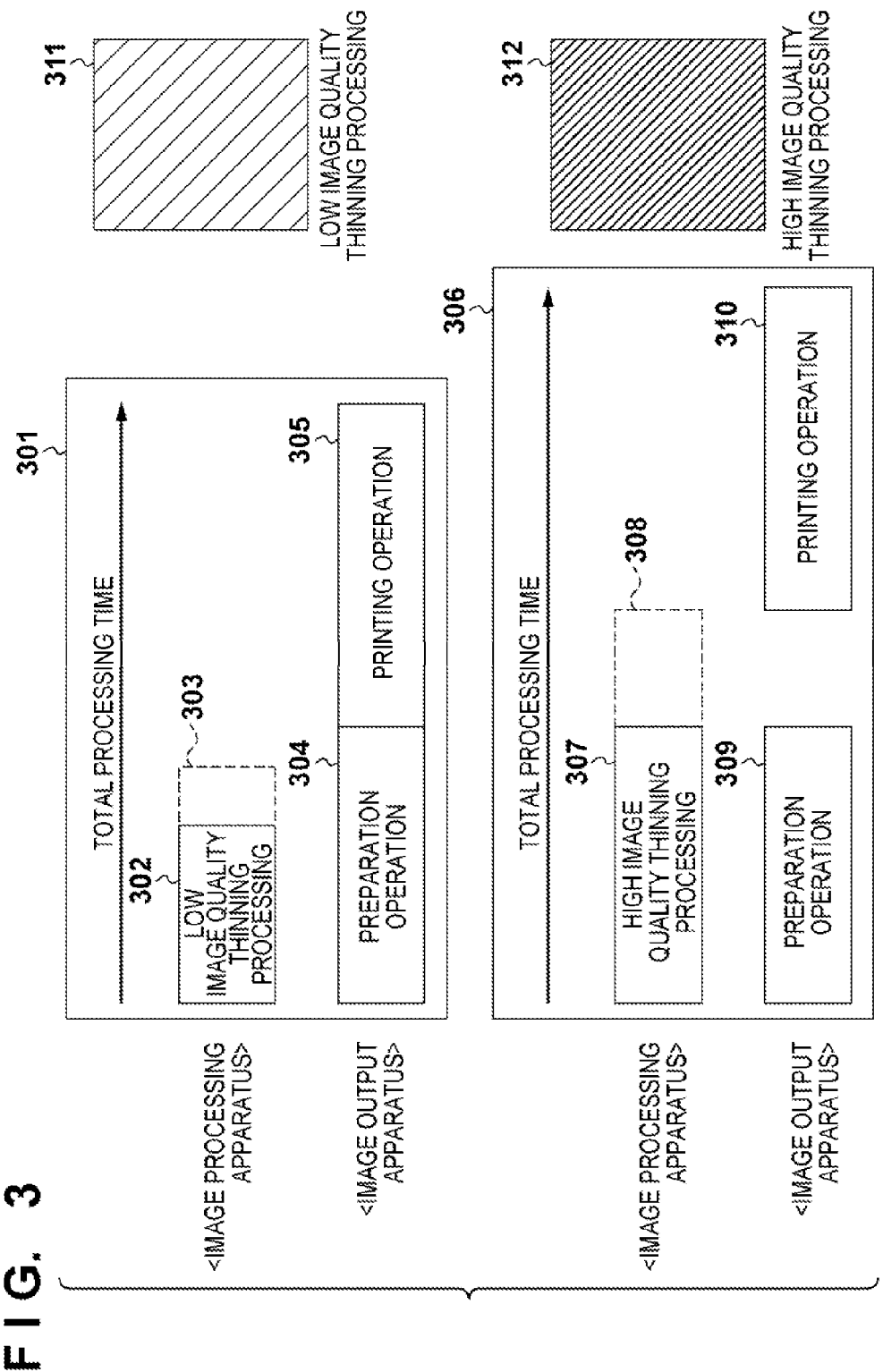
FIG. 3 shows timing charts for explaining thinning processing control according to a conventional technique.

FIG. 3 shows the operation of the thinning processing according to the conventional technique, and is an operation timing chart having the width of each operation as the length of a processing time. In the conventional technique, one of a plurality of thinning processes including high image quality thinning processing and low image quality thinning processing is fixedly selected. A chart 301 in FIG. 3 shows the operation contents and processing time of low image quality thinning processing. A chart 306 in FIG. 3 shows the operation contents and processing time of high image quality thinning processing.

Processing times 302 and 303 schematically indicate a time required for the low image quality thinning processing executed in the image processing apparatus 103. The processing time 302 indicates a processing time when another processing conflicting over the CPU resource is not executed. The processing time 303 indicates an additional processing time (difference) when another processing is executed. The image processing apparatus 103 transfers, to the image output apparatus 104, image data 311 generated after the thinning processing ends.

The image output apparatus 104 performs a preparation operation (which takes a processing time 304) including a pre-rotation operation of the printer engine 111 and an inter-page control operation within the processing times 302 and 303 in the thinning processing. Upon receiving the image data 311 from the image processing apparatus 103, the image output apparatus 104 starts a printing operation (which takes a processing time 305). For the low image quality thinning processing, since the processing times 302 and 303 taken for the thinning processing are relatively short, a margin does not occur between the processing time 304 taken for the preparation operation and the processing time 305 taken for the printing operation. Therefore, while ensuring a given inherent productivity of the printer engine 111, it is possible to execute the thinning processing.

Processing times 307 and 308 schematically indicate a time required for the high image quality thinning processing executed in the image processing apparatus 103. The processing time 307 indicates a processing time when another processing conflicting over the CPU resource is not executed. The processing time 308 indicates an additional processing time (difference) when another processing is executed. The image processing apparatus 103 transfers, to the image output apparatus 104, image data 312 generated after the thinning processing ends.

The image output apparatus 104 performs a preparation operation (which takes a processing time 309) including a pre-rotation operation of the printer engine 111 and an inter-page control operation within the processing times 307 and 308 in the thinning processing. Upon receiving the image data 312 from the image processing apparatus 103, the image output apparatus 104 starts a printing operation (which takes a processing time 310). For the high image quality thinning processing, since the processing times 307 and 308 taken for the thinning processing are relatively long, a margin between the processing time 309 taken for the preparation operation and the processing time 310 taken for the printing operation is large as compared with the low image quality thinning processing. Therefore, the processing time required for the whole processing increases, and the productivity of the printing operation lowers. Consequently, even though it is possible to ensure the inherent productivity of the printer engine 111 when the processing time 308 for the thinning processing does not occur, the productivity guaranteed by the apparatus as a whole decreases in consideration of the processing time 309 of the thinning processing which has increased due to a conflict over the CPU resource.

Figure 4:
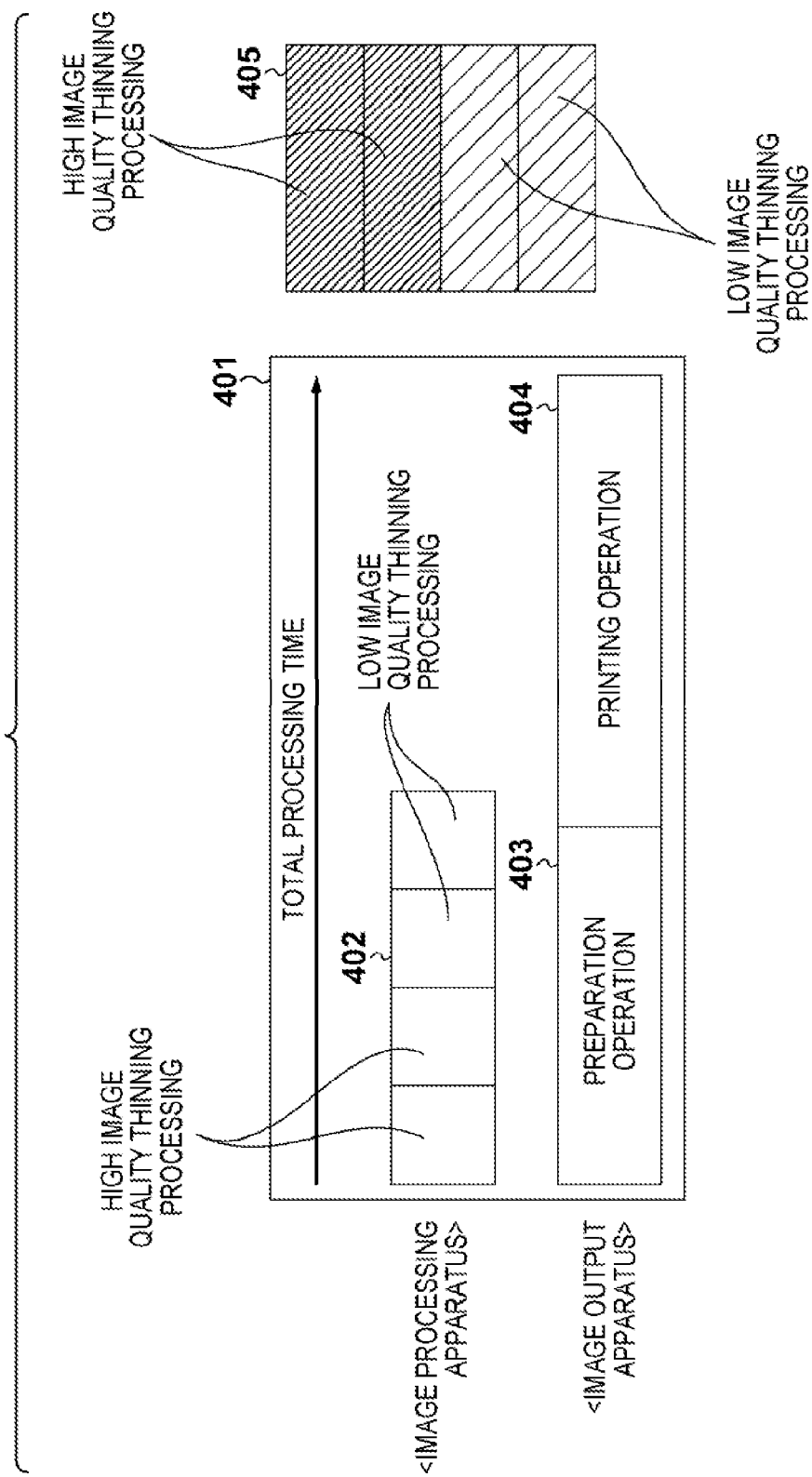
FIG. 4 is a timing chart for explaining thinning processing control according to the embodiment.

The processing time according to this embodiment will be explained. FIG. 4 shows the operation of the thinning processing according to this embodiment, and is an operation timing chart having the width of each operation as the length of a processing time. In this embodiment, by switching between high image quality thinning processing and low image quality thinning processing within the page of image data, the thinning processing is completed within a given processing time and the productivity of a printing operation is ensured.

A chart 401 shows the operation contents and processing time of a thinning processing control according to this embodiment. A processing time 402 schematically indicates a time required for the processes of the thinning processing executed in the image processing apparatus 103. In this embodiment, image data to undergo the thinning processing is divided into predetermined regions, one of the high image quality thinning processing and the low image quality thinning processing is selected and executed for each divided image. Image data 405 which has been divided into four images is exemplified.

To execute the thinning processing for a divided image, the image processing apparatus 103 determines based on an accumulated thinning processing time for the image data and status information about the operation status of another processing at that time whether it is possible to ensure the productivity if the high image quality thinning processing is selected. The processing time 402 required for the thinning processing is represented as a total processing time for the image data which has been divided into four images. If the apparatus 103 determines that it is possible to ensure the productivity, it executes the high image quality thinning processing. After that, the apparatus 103 executes the low image quality thinning processing. Whether it is possible to ensure the productivity can be determined based on, for example, whether the thinning processing for all images as thinning processing targets is complete within a processing time 403 required for a preparation operation in the image output apparatus 104. Even when the time required for the thinning processing exceeds the processing time required for the preparation operation, it may be determined that it is possible to ensure the productivity if a given threshold is set and the thinning processing is completed within the given threshold.

FIG. 4 shows a case in which the thinning processing is switched to execute the low image quality thinning processing for the third one of the four divided images. The image processing apparatus 103 transfers, to the image output apparatus 104, the image data 405 generated after the thinning processing ends.

On the other hand, the image output apparatus 104 performs the preparation operation including a pre-rotation operation of the printer engine 111 and an inter-page control operation within the processing time 402 for the thinning processing. Upon receiving the image data 405 from the image processing apparatus 103, the image output apparatus 104 starts a printing operation.

By switching between the high image quality thinning processing and the low image quality thinning processing within the page of image data in the thinning processing, it is possible to execute the high image quality thinning processing while ensuring a given productivity without depending on the operation status of another processing. As described in the background of the invention, it is known that a toner scattering problem tends to occur upstream in a medium conveyance direction. If, therefore, the thinning processing is switched within a page, it is possible to efficiently prevent toner scattering in terms of the image quality and processing time by executing the high image quality thinning processing for the upper portion of the page and executing the low image quality thinning processing for the lower portion of the page as in the embodiment. The upper portion of the page indicates a region (its position y in the sub-scanning direction has a small value) which is to undergo image forming earlier.

[Thinning Processing Control]

Figure 5A:
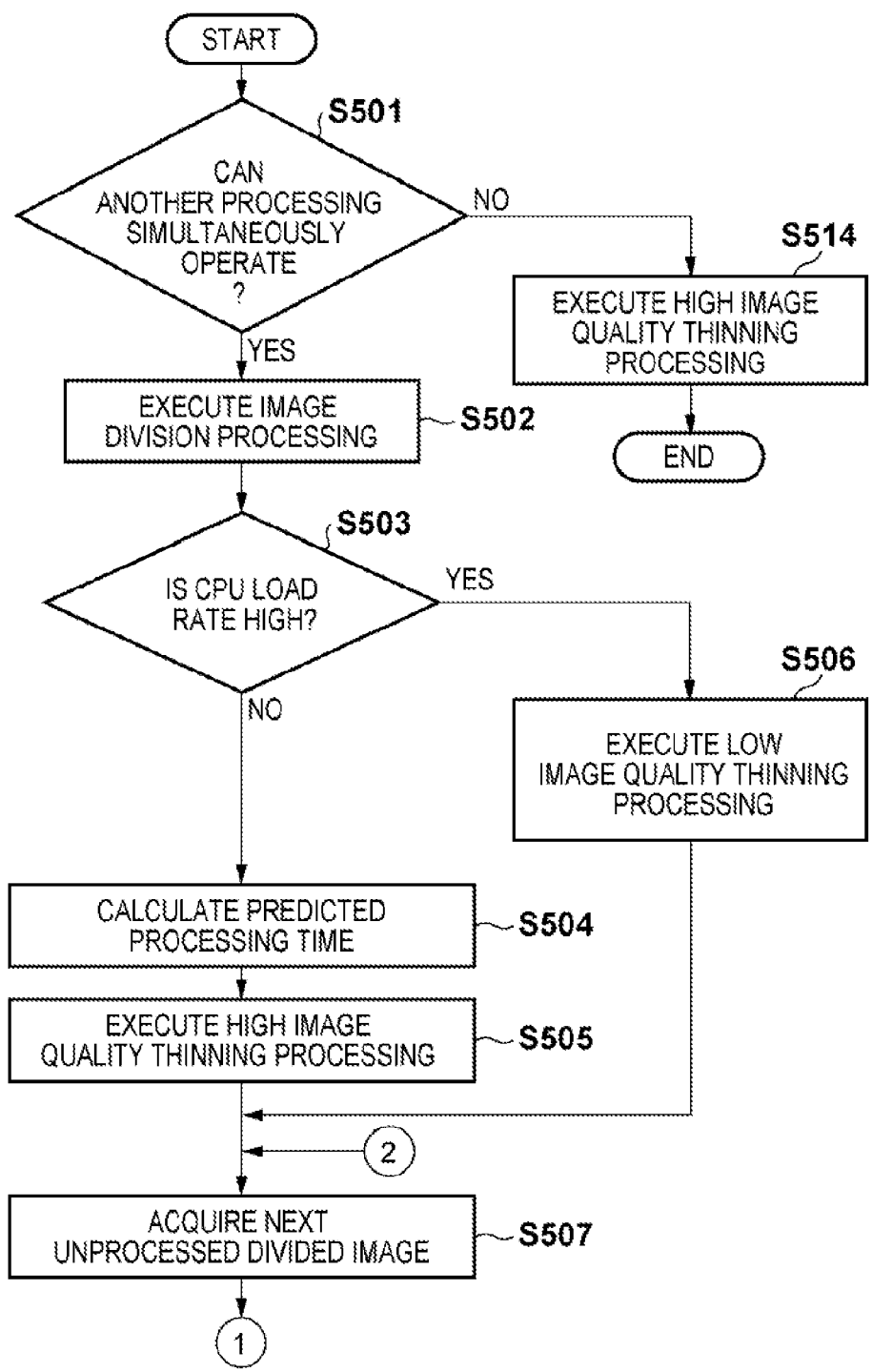
FIGS. 5A and 5B are flowcharts illustrating the thinning processing control according to the embodiment.
Figure 5B:
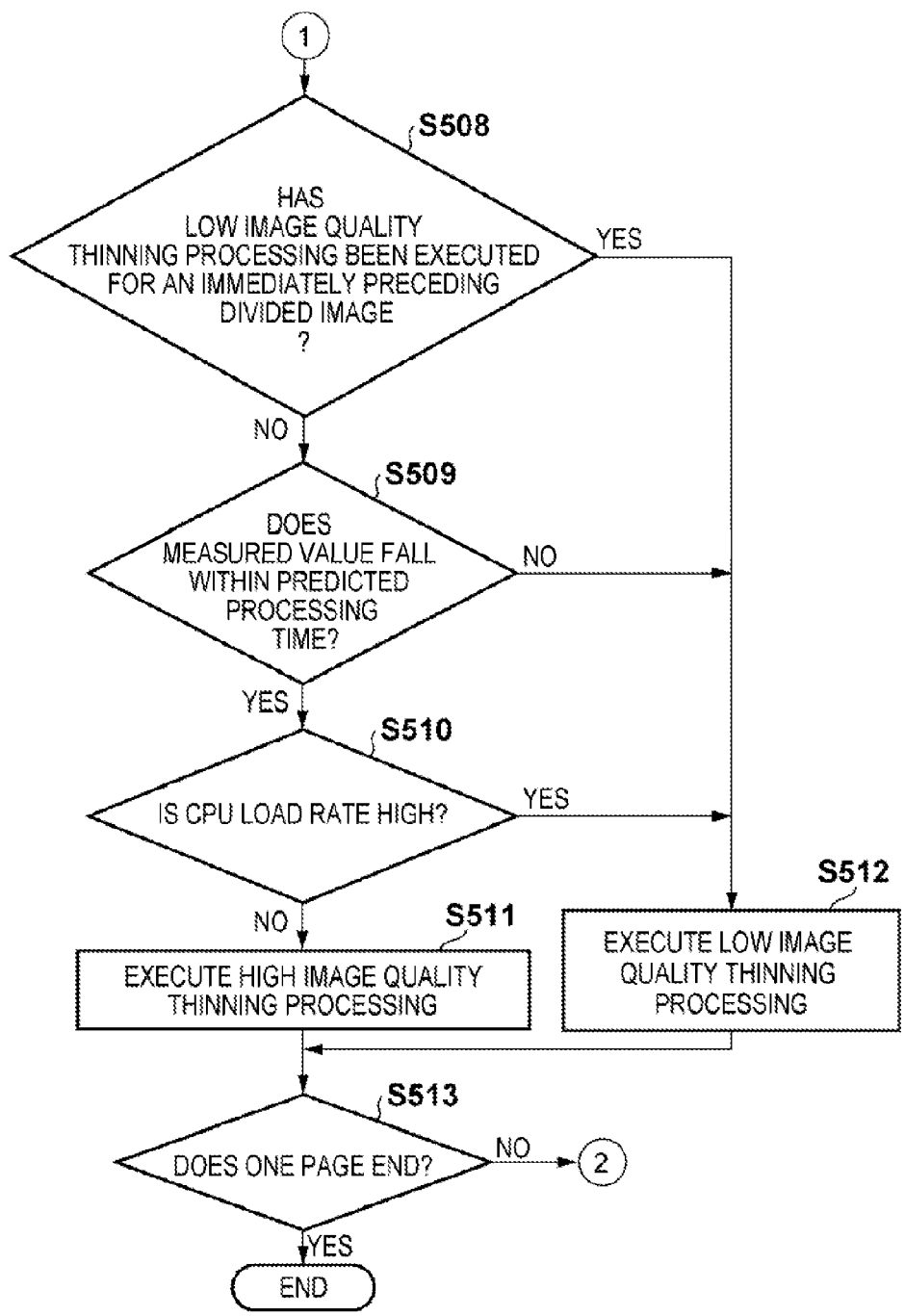

The thinning processing control including switching determination processing according to this embodiment will be described in detail with reference to FIGS. 5A, 5B, and 6. FIGS. 5A and 5B are flowcharts illustrating the thinning processing control according to this embodiment, which implements the thinning processing switching explained with reference to FIG. 4.

In conflicting operation determination processing in step S501, the CPU 201 determines whether another processing can simultaneously operate during execution of the thinning processing. If there is no possibility of occurrence of a conflicting operation (NO in step S501), the CPU 201 executes the high image quality thinning processing for the whole one page (S514), and ends the process. This is done because it is possible to ensure a given productivity of a printing operation even if the high image quality thinning processing is executed for the whole one page when there is no conflicting operation. There is a possibility of occurrence of a conflicting operation (YES in step S501), the process advances to step S502. The conflicting operation determination processing will be described in detail later with reference to FIG. 6.

In image division processing in step S502, the CPU 201 divides image data for one page into predetermined image regions. The predetermined image regions are obtained by dividing the image data in a direction perpendicular to the medium conveyance direction as represented by the image data 405. In the division processing, the image data may be divided into a predetermined number of divided images, or may be divided for each predetermined size. The process advances to step S503, and succeeding processing is executed for each divided image.

In CPU load rate determination processing in step S503, the CPU 201 acquires a CPU load rate at this time from information of an OS installed in the image processing apparatus 103, and determines whether another processing conflicting over the CPU resource is operating. If the CPU load rate is equal to or larger than a predetermined threshold, the CPU 201 determines that another processing is operating (YES in step S503), and executes the low image quality thinning processing for a target divided image (S506). Then, the process advances to step S507. If the CPU load rate is smaller than the predetermined threshold (NO in step S503), the process advances to step S504. In thinning processing time prediction processing in step S504, the CPU 201 calculates a predicted processing time of the high image quality thinning processing using the size of the divided image and the clock of the CPU 201. A method of predicting a processing time is not limited to the above method, and a processing time may be calculated using another criterion and LUT. The CPU 201 executes the high image quality thinning processing for the divided image of interest to be processed (S505). Then, the process advances to step S507. In step S507, the CPU 201 acquires, as a divided image of interest, a next divided region which has not been applied with thinning processing.

In thinning processing result determination processing in step S508, the CPU 201 determines which one of the high and low image quality thinning processes has been executed for the divided image processed immediately before the divided image of interest. If the low image quality thinning processing has been executed (YES in step S508), the CPU 201 executes the low image quality thinning processing for the current divide image of interest (S512). If the high image quality thinning processing has been executed for the immediately preceding divided image (NO in step S508), the CPU 201 acquires a measured processing time of the thinning processing for the immediately preceding divided image. If the measured processing time exceeds the predicted processing time calculated in step S504 (NO in step S509), the CPU 201 applies the low image quality thinning processing to the divided image of interest (S512). If the measured processing time is equal to or shorter than the predicted processing time (YES in step S509), the process advances to step S510.

In CPU load rate determination processing in step S510, the CPU 201 determines whether another processing conflicting over the CPU resource is operating, as in step S503. If the CPU load rate is equal to or larger than the predetermined threshold, the CPU 201 determines that another processing is operating (YES in step S510), and applies the low image quality thinning processing to the divided region of interest (S512). Alternatively, if the CPU load rate is smaller than the predetermined threshold (NO in step S510), the CPU 201 applies the high image quality thinning processing to the divided region of interest (S511).

If it is determined in page end determination processing in step S513 that there is a next divided image which has not undergone thinning processing (NO in step S513), the CPU 201 returns the process to step S507 to repeat the processing. If the thinning processing is complete for all the divided images (YES in step S513), the CPU 201 ends the thinning processing control.

The conflicting operation determination processing in step S501 of FIG. 5A will be described in detail with reference to FIG. 6. FIG. 6 shows an example of a table used for the conflicting operation determination processing of the image processing apparatus according to this embodiment. This table shows the relationship between a job being currently executed and a parallelly executable job (while conflicting over the CPU). The conflicting operation control of a job for which a next execution request is sent for a job being currently executed is indicated by ○ and x. In FIG. 6, "○" allows a simultaneous operation, and "x" does not allow a simultaneous operation and a corresponding job is thus executed after the job being currently executed ends.

In the conflicting operation determination processing in step S501, it is determined based on the conflicting operation control in FIG. 6 and the connection statuses of the network I/F 208, external I/F 209, and communication line I/F 210 in FIG. 2 whether another processing can simultaneously operate during execution of the thinning processing. Even if a simultaneous operation is allowed according to the conflicting operation control, for example, when an interface to be used by a corresponding job is unconnected, it is determined that the job cannot simultaneously operate. In FIG. 6, (○) indicates a case depending on the connection status of an interface. Although not shown, assume that a management unit manages the connection status of each I/F as status information, and the RAM 203 serving as a storage unit manages the status information when a device is connected/disconnected to/from the I/F.

If, for example, the job being currently executed is the thinning processing of a copy job, in the conflicting operation determination processing in step S501, it is firstly determined based on the conflicting operation control of FIG. 6 that a Fax Print job may conflict. Secondly, the connection status of the communication line I/F 210 to be used by the Fax Print job is acquired from the management unit. Then, if the connection status indicates that the communication line I/F 210 is connected, it is determined that a simultaneous operation is possible; otherwise, it is determined that a simultaneous operation is impossible.

The conflicting operation determination processing (S501) is performed first in the processing shown in FIG. 5A. As described in step S503 or S510, the determination is made in consideration of a case in which a conflicting operation may be performed in the middle of the processing. Even in the middle of the processing, therefore, it is possible to switch the thinning processing.

Although a case in which the high and low image quality thinning processes are switched to be applied has been described in this embodiment, the present invention is not limited to this and three or more kinds of thinning processes may be switched. For example, assume that middle image quality thinning processing between the high and low image quality processes is set to be executable. For a job, whose load on the CPU resource is small, of jobs for which a conflicting operation is possible, the middle image quality thinning processing may be executed.

Although a case in which the high and low image quality thinning processes are switched to be applied has been explained in this embodiment, any high and low image quality image processes other than thinning processing may be used. An example of the image processing may include, for example, image luminance correction processing, color correction processing, saturation correction processing, and another image processing.

According to this embodiment, it is possible to provide a system which completes thinning processing within a given processing time to ensure a given productivity of a printing operation by switching between high image quality thinning processing and low image quality thinning processing within the page of image data.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-293806, filed Dec. 28, 2010, which is hereby incorporated by reference herein in its entirety.

What is claimed is:

1. An image processing apparatus for performing image thinning processing, comprising:
    a thinning unit configured to be able to execute a plurality of thinning processes which have different output image qualities and processing times;
    an acquisition unit configured to acquire status information indicating a status of said apparatus;
    a division unit configured to divide an image into a plurality of divided images;
    a prediction unit configured to predict a processing time when thinning processing executed by said thinning unit is applied to each divided image divided by said division unit; and
    a selection unit configured to select, based on the status information acquired by said acquisition unit and the predicted processing time predicted by said prediction unit, thinning processing to be applied to each divided image from the plurality of thinning processes executed by said thinning unit,
    wherein said acquisition unit acquires, as the status information, a connection status with an external apparatus and an operation status of processing other than the thinning processing executed by said thinning unit,
    wherein when an external apparatus is not connected, said selection unit selects thinning processing whose output image quality is high from the plurality of thinning processes executed by said thinning unit.

2. The apparatus according to claim 1, further comprising a measurement unit configured to measure a processing time of the thinning processing applied to each divided image, wherein said selection unit compares the measured processing time measured by said measurement unit with the predicted processing time predicted by said prediction unit, and when the measured processing time is longer, said selection unit selects, for an unprocessed divided image, thinning processing whose processing time is short from the plurality of thinning processes executed by said thinning unit.

3. The apparatus according to claim 2, wherein when an accumulated measured processing time of the thinning processes executed for the divided images exceeds a predetermined threshold, said selection unit selects, for an unprocessed divided image, thinning processing whose processing time is short from the plurality of thinning processes executed by said thinning unit.

4. The apparatus according to claim 1, wherein when processing other than the thinning processing executed by said thinning unit is operating, said selection unit selects thinning processing whose processing time is short from the plurality of thinning processes executed by said thinning unit.

5. The apparatus according to claim 1, further comprising a table in which a simultaneously executable job is associated, wherein when an external apparatus to be used by a job executable simultaneously with a job being currently executed is not connected, said selection unit selects, based on the table and the connection status, thinning processing whose output image quality is high from the plurality of thinning processes executed by said thinning unit.

6. The apparatus according to claim 1, wherein the plurality of thinning processes executed by said thinning unit include first thinning processing and second thinning processing in which an output image quality is low and a processing time is short as compared with the first thinning processing.

7. An image processing method of performing image thinning processing, comprising:

a thinning step capable of executing a plurality of thinning processes which have different output image qualities and processing times;

an acquisition step of managing status information indicating a status of an image processing apparatus;

a division step of dividing an image into a plurality of divided images;

a prediction step of predicting a processing time when thinning processing executed in the thinning step is applied to each divided image divided in the division step; and a selection step of selecting, based on the status information acquired in the acquisition step and the predicted processing time predicted in the prediction step, thinning processing to be applied to each divided image from the plurality of thinning processes executed in the thinning step, wherein in the acquisition step, a connection status with an external apparatus and an operation status of processing other than the thinning processing executed in the thinning step are acquired as the status information, wherein when an external apparatus is not connected, in the selection step, thinning processing whose output image quality is high is selected from the plurality of thinning processes executed in the thinning step.

8. A non-transitory computer-readable medium storing a program for causing a computer to function as:

a thinning unit configured to able to execute a plurality of thinning processes which have different output image qualities and processing times;

an acquisition unit configured to acquire status information indicating a status of the computer;

a division unit which divides an image into a plurality of divided images;

a prediction unit configured to predict a processing time when thinning processing executed by the thinning unit is applied to each divided image divided by the division unit; and a selection unit configured to select, based on the status information acquired by the acquisition unit and the predicted processing time predicted by the prediction unit, thinning processing to be applied to each divided image from the plurality of thinning processes executed by the thinning unit, wherein the acquisition unit acquires, as the status information, a connection status with an external apparatus and an operation status of processing other than the thinning processing executed by the thinning unit, wherein when an external apparatus is not connected, the selection unit selects thinning processing whose output image quality is high from the plurality of thinning processes executed by the thinning unit.

* * * * *